United States Patent
Davidson

(10) Patent No.: US 10,467,580 B1
(45) Date of Patent: Nov. 5, 2019

(54) METHODS, APPARATUSES AND COMPUTER PROGRAM PRODUCTS FOR GENERATING LOGISTICS ZONES

(71) Applicant: United Parcel Service of America, Inc., Atlanta, GA (US)

(72) Inventor: Mark J. Davidson, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 1335 days.

(21) Appl. No.: 13/964,766

(22) Filed: Aug. 12, 2013

(51) Int. Cl.
*G06Q 10/08* (2012.01)
(52) U.S. Cl.
CPC .............................. *G06Q 10/08355* (2013.01)
(58) Field of Classification Search
CPC .. G06Q 10/08; G06Q 10/083; G06Q 10/0833; G06Q 10/087; G06Q 10/0832; G06Q 10/0834
See application file for complete search history.

(56) References Cited

U.S. PATENT DOCUMENTS

| | | | | |
|---|---|---|---|---|
| 2006/0262967 | A1* | 11/2006 | Hurst ..................... | G06Q 10/00 382/128 |
| 2007/0102329 | A1* | 5/2007 | Rosenbaum .............. | B07C 3/14 209/584 |
| 2011/0178945 | A1* | 7/2011 | Hirai ...................... | G06Q 10/08 705/338 |
| 2014/0351164 | A1* | 11/2014 | Ballenger ........ | G06Q 10/08355 705/338 |

OTHER PUBLICATIONS

"NavTech database featured in advanced fleet applications; comdata RoTec has incorporated the NavTech database into a set of advanced transportation routing systems expected to result in significant savings for fleet operators." (Oct. 30, 1996). Business Wire (Year: 1996).*
Goldberg, D. W., Wilson, J.P., & Knoblock, C. A. (2007). "From text to geographic coordinates: The current state of geocoding." URISA Journal, 19(1), 33(14). (Year: 2007).*

* cited by examiner

*Primary Examiner* — Michael P Harrington
(74) *Attorney, Agent, or Firm* — Shook, Hardy & Bacon L.L.P.

(57) ABSTRACT

An apparatus is provided for generating logistics zones. The apparatus may include at least one memory and at least one processor configured to generate logistics zones responsive to receipt of a selection of a geographic area. The logistics zones are generated based on street segment attribute data. The logistics zones include a geo-fenced right zone on a right side of corresponding street segments and a geo-fenced left zone on a left side of the street segments. The processor is also configured to determine addresses in the logistics zones based on analyzing the street segment attribute data. The processor is further configured to generate a route for delivery or pickup of packages within the logistics zones based on a trace order of the logistics zones specifying a sequential order to travel within the logistics zones responsive to determining a shortest travel path. Corresponding computer program products and methods are also provided.

20 Claims, 16 Drawing Sheets

METHODS, APPARATUSES AND COMPUTER PROGRAM PRODUCTS FOR GENERATING LOGISTICS ZONES

TECHNOLOGICAL FIELD

Embodiments of the invention relate generally to generating logistics zones and more generally relate to methods, apparatuses and computer program products for utilizing the logistics zones to facilitate delivery and/or pickup of packages.

BACKGROUND

Currently, shipping carriers develop dispatch plans for the delivery of packages based on delivery stops on individual streets. However, in some instances this may not be the most efficient manner in which to deliver packages. For instance, there may be multiple deliveries in a particular area for delivery stops that are on different streets and as such the dispatch plan may not be optimized for delivery of the packages in the area. For example, the dispatch plan may designate to deliver packages on a specified street (e.g., Main Street) in a city and the next delivery in the dispatch plan may be designated on another street that is five miles away in the same city. However, there may be other designated deliveries in the dispatch plan on a street (e.g., Broad Street) in another city that is one mile away from the specified street (e.g., Main Street). As such, a need may exist for improved delivery systems.

BRIEF SUMMARY

A method, apparatus and computer program product are therefore provided for generating one or more logistics zones. The exemplary embodiments may utilize the logistics zones to determine an optional travel route for delivery or pickup of packages in the logistics zones. In addition, the exemplary embodiments may determine the planned travel miles for the route, the planned travel time for the route as well as other suitable shipping data.

Exemplary embodiments implementing logistics zones from a dispatch perspective simplify and improve usability of a dispatch application by being able to group planned time together into logical groups called logistics zones, based on deliveries and pickups, miles etc. associated with a geographic area. For example, in an application interface these logistics zones may appear as geofenced areas to a user and the user may select a logistic zone(s) and assign the selected logistics zone to a driver by dragging and dropping the logistic zone onto data indicating a route or data indicating a driver.

The exemplary embodiments may aggregate characteristics defined within a geography of a logistics zone. For instance, the aggregated characteristics defined within the geography may correspond to addresses, homes, buildings, people living in a logistic zone(s), associated income, census types of information, standard industrial classification (SIC) codes associated with a logistic zone, and any other suitable characteristics.

The exemplary embodiments may generate planning attributes to deliver a parcel to a house(s)/building(s) in a logistics zone which may include but is not limited to miles, time, package and/or shipment attributes. These attributes may be used to aggregate information common to the logistics zone.

The logistics zones may be grouped together to form a larger zone(s) or geo-fenced area(s). As such, the exemplary embodiments may group information together to enhance the dispatch process. Each logistics zone may be assigned a unique identifier (id).

By utilizing exemplary embodiments, shipments, deliveries, and/or pickups may be aggregated from various sources, shippers, etc. to provide a limited number of transportation vehicles for travel to an area of a logistics zone. Packages may be containerized for a particular logistics zone.

The exemplary embodiments may generate a unique human readable handling instruction code assigned to each logistics zone. As logistics zones are grouped together each logistics zone may be assigned a particular sequence that provides information regarding an order in which packages of a logistics zone are to be delivered and/or picked up. Additionally, the exemplary embodiments may order each address or building inside of a logistics zone(s). Additionally, one or more priorities may be ascribed to a particular logistics zone(s).

In one example embodiment, a method for generating one or more logistics zones is provided. The method may include generating one or more logistics zones in response to receipt of an indication of a selection of a geographic area. The logistics zones may be generated based in part on items of street segment attribute data. Each of the logistics zones may include a geo-fenced right zone on a right side of corresponding street segments and a geo-fenced left zone on a left side of the corresponding street segments. The method may further include determining addresses in each of the logistics zones based in part on analyzing the items of street segment attribute data. The method may further include generating a travel route for delivery or pickup of packages within the logistics zones based in part on a determined trace order of the logistics zones specifying a sequential order in which to travel within the logistics zones in response to determining a shortest travel path.

In another example embodiment, an apparatus for generating one or more logistics zones is provided. The apparatus may include a processor and a memory including computer program code. The memory and computer program code are configured to, with the at least one processor, cause the apparatus to at least perform operations including generating one or more logistics zones in response to receipt of an indication of a selection of a geographic area. The logistics zones may be generated based in part on items of street segment attribute data. Each of the logistics zones may include a geo-fenced right zone on a right side of corresponding street segments and a geo-fenced left zone on a left side of the corresponding street segments. The memory and computer program code are also configured to, with the processor, cause the apparatus to determine addresses in each of the logistics zones based in part on analyzing the items of street segment attribute data. The memory and computer program code are also configured to, with the processor, cause the apparatus to generate a travel route for delivery or pickup of packages within the logistics zones based in part on a determined trace order of the logistics zones specifying a sequential order in which to travel within the logistics zones in response to determining a shortest travel path.

In yet another example embodiment, a computer program product for generating one or more logistics zones is provided. The computer program product includes at least one computer-readable storage medium having computer-executable program code instructions stored therein. The computer-executable program code instructions may include program code instructions configured to generate one or more logistics zones in response to receipt of an indication of a selection of a geographic area. The logistics zones may be generated based in part on items of street segment attribute data. Each of the logistics zones may include a geo-fenced right zone on a right side of corresponding street segments and a geo-fenced left zone on a left side of the corresponding street segments. The computer program product may further include program code instructions configured to determine addresses in each of the logistics zones based in part on analyzing the items of street segment attribute data. The computer program product may further include program code instructions configured to generate a travel route for delivery or pickup of packages within the logistics zones based in part on a determined trace order of the logistics zones specifying a sequential order in which to travel within the logistics zones in response to determining a shortest travel path.

BRIEF DESCRIPTION OF THE SEVERAL VIEWS OF THE DRAWINGS

Figure 1:
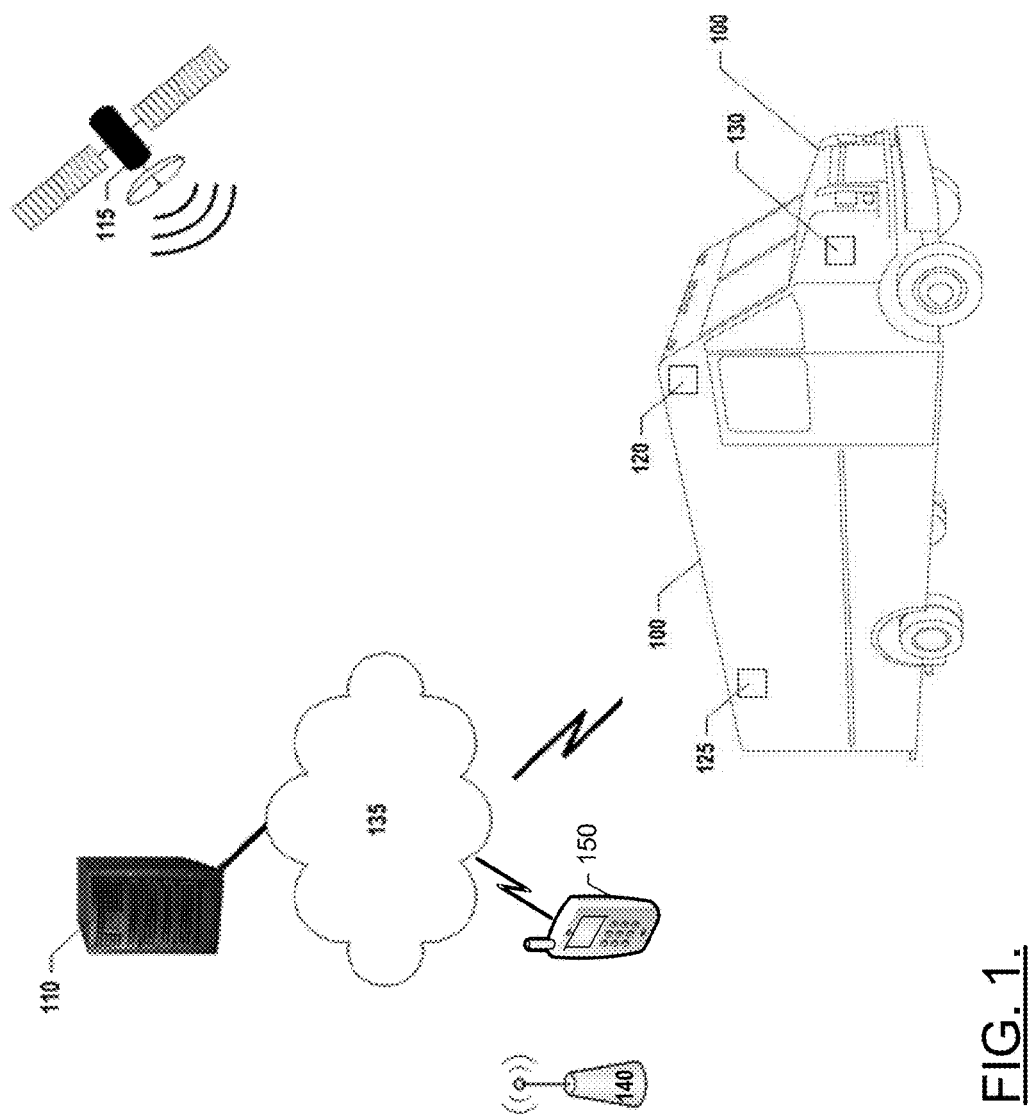
Figure 2:
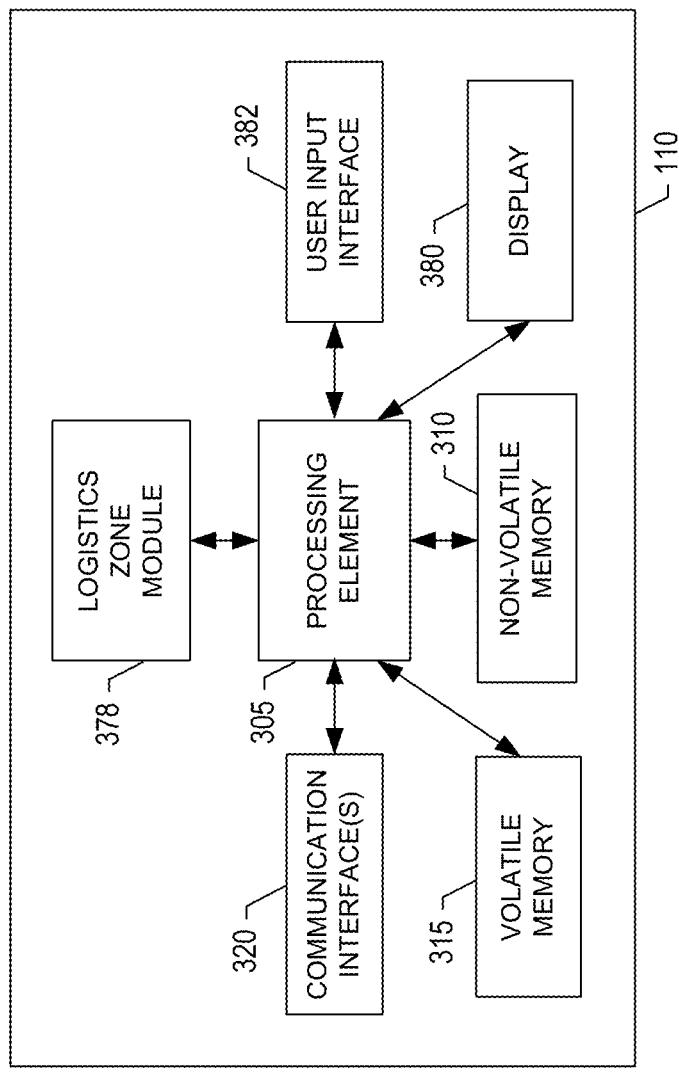
Figure 3:
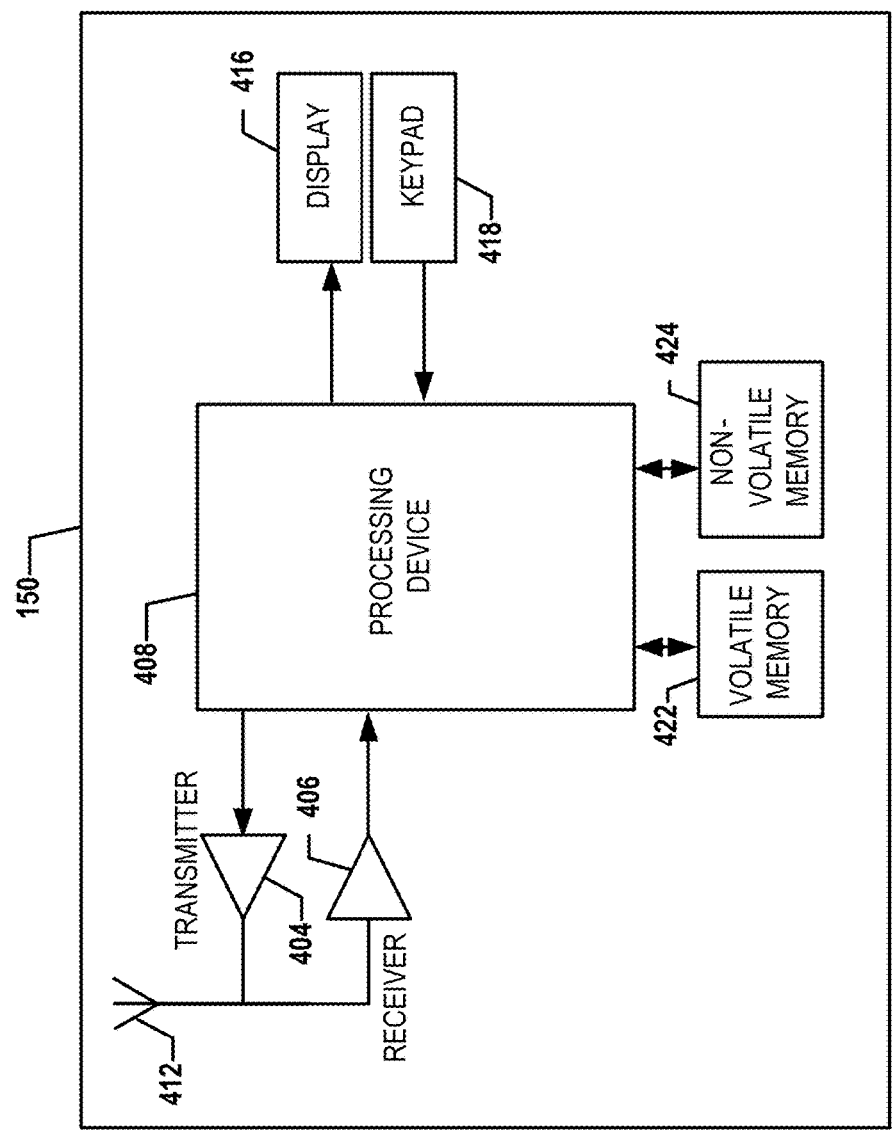
Figure 4:
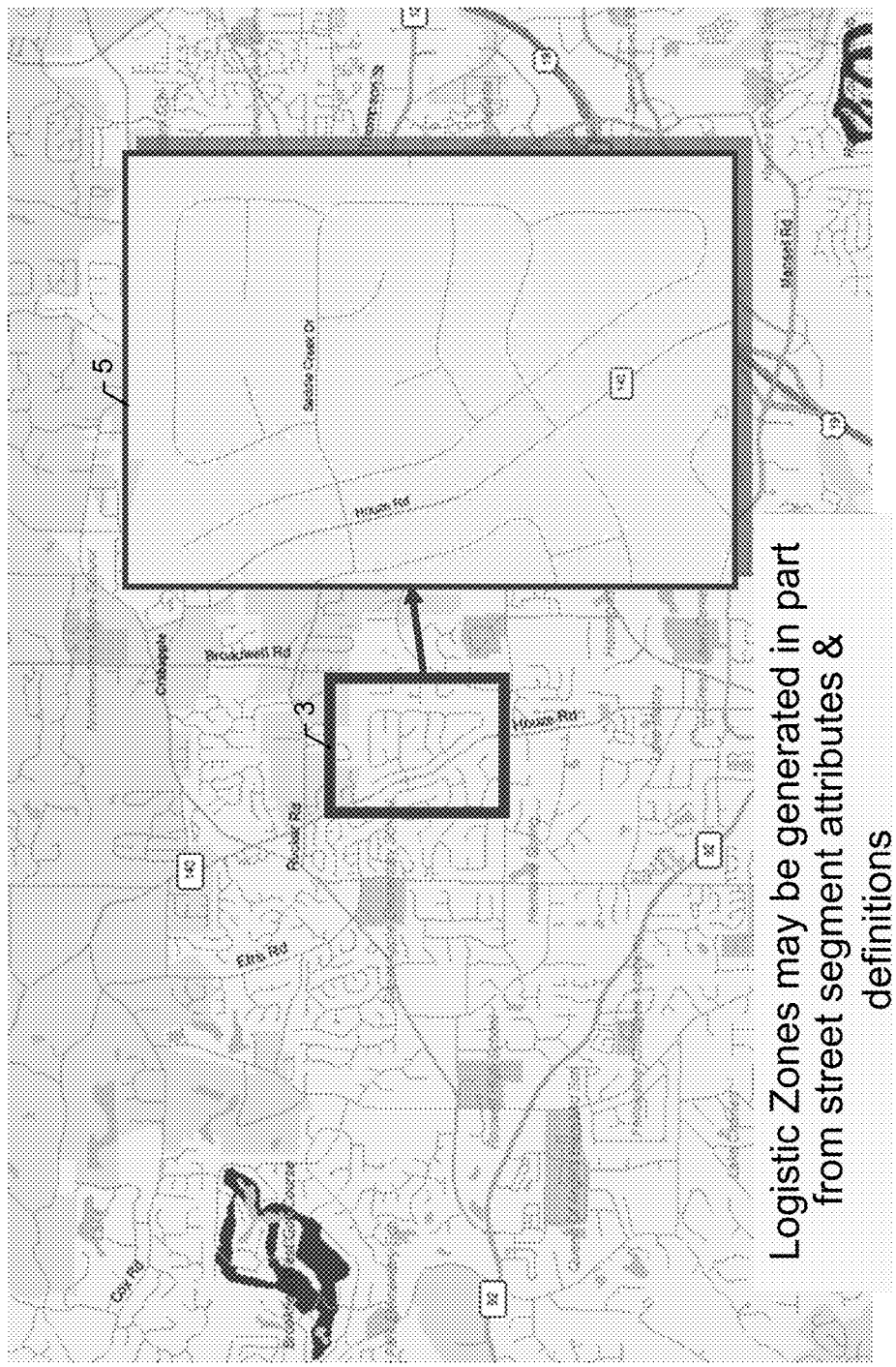
Figure 5A:
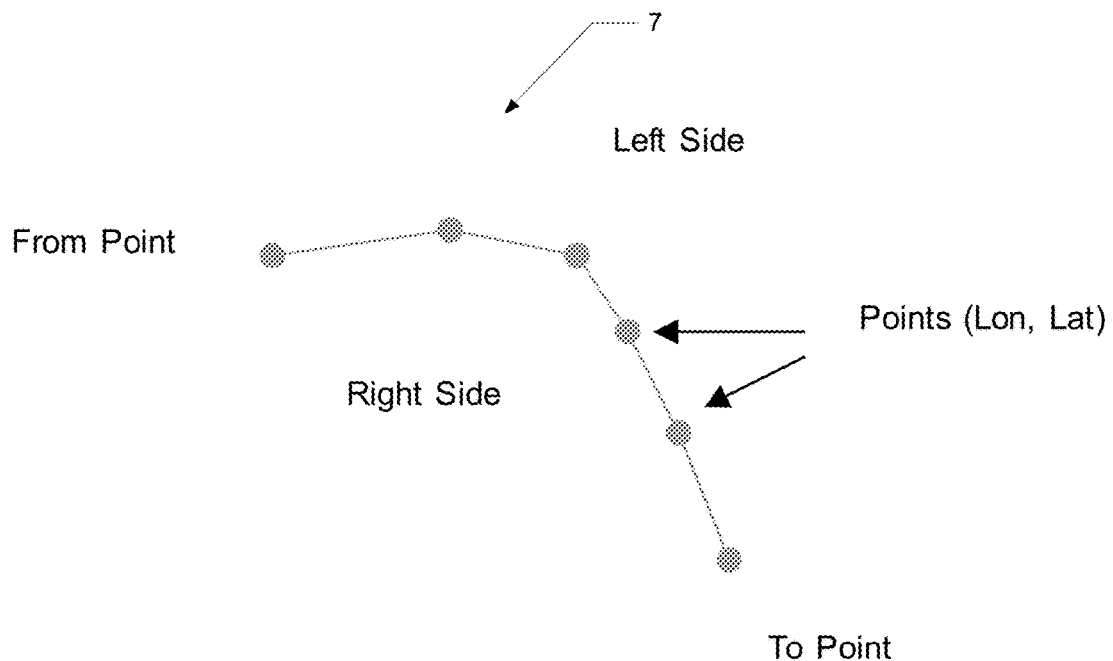
Figure 5B:
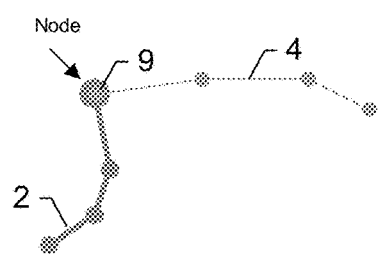
Figure 13:
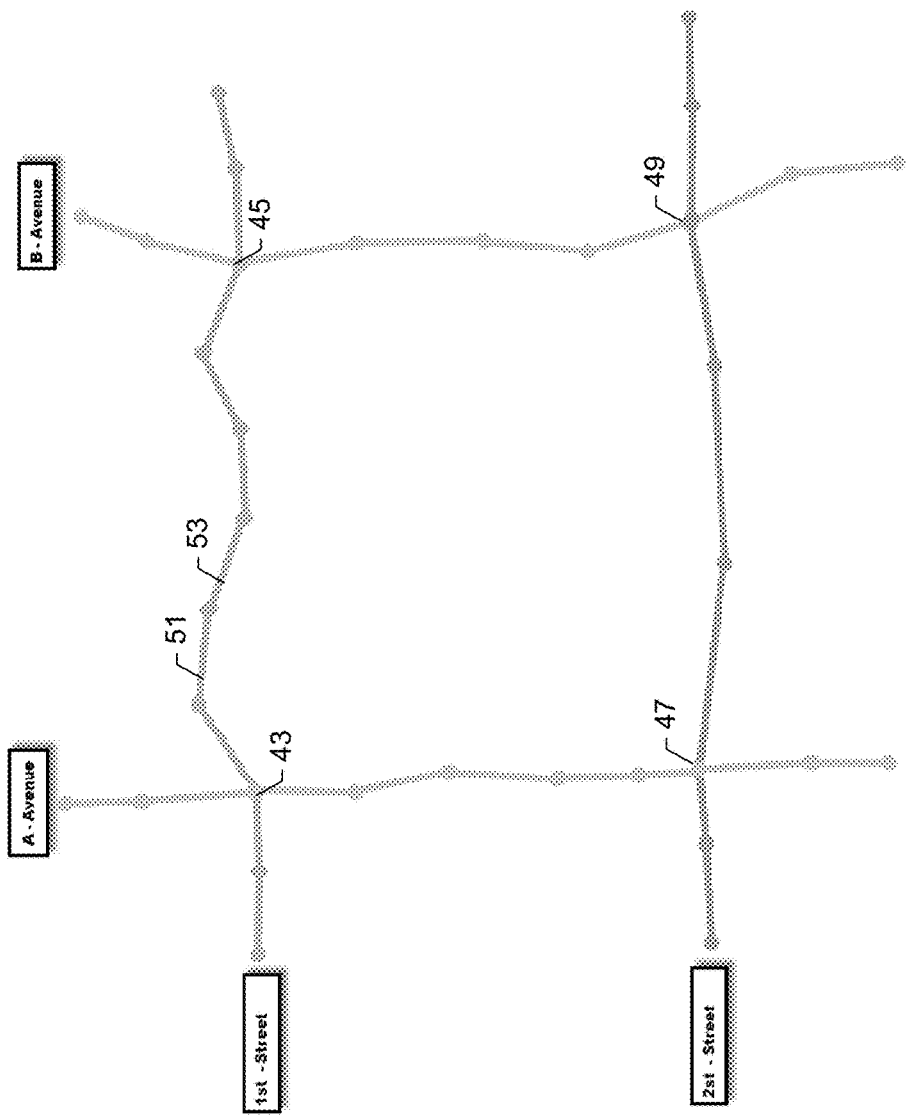
Figure 14:
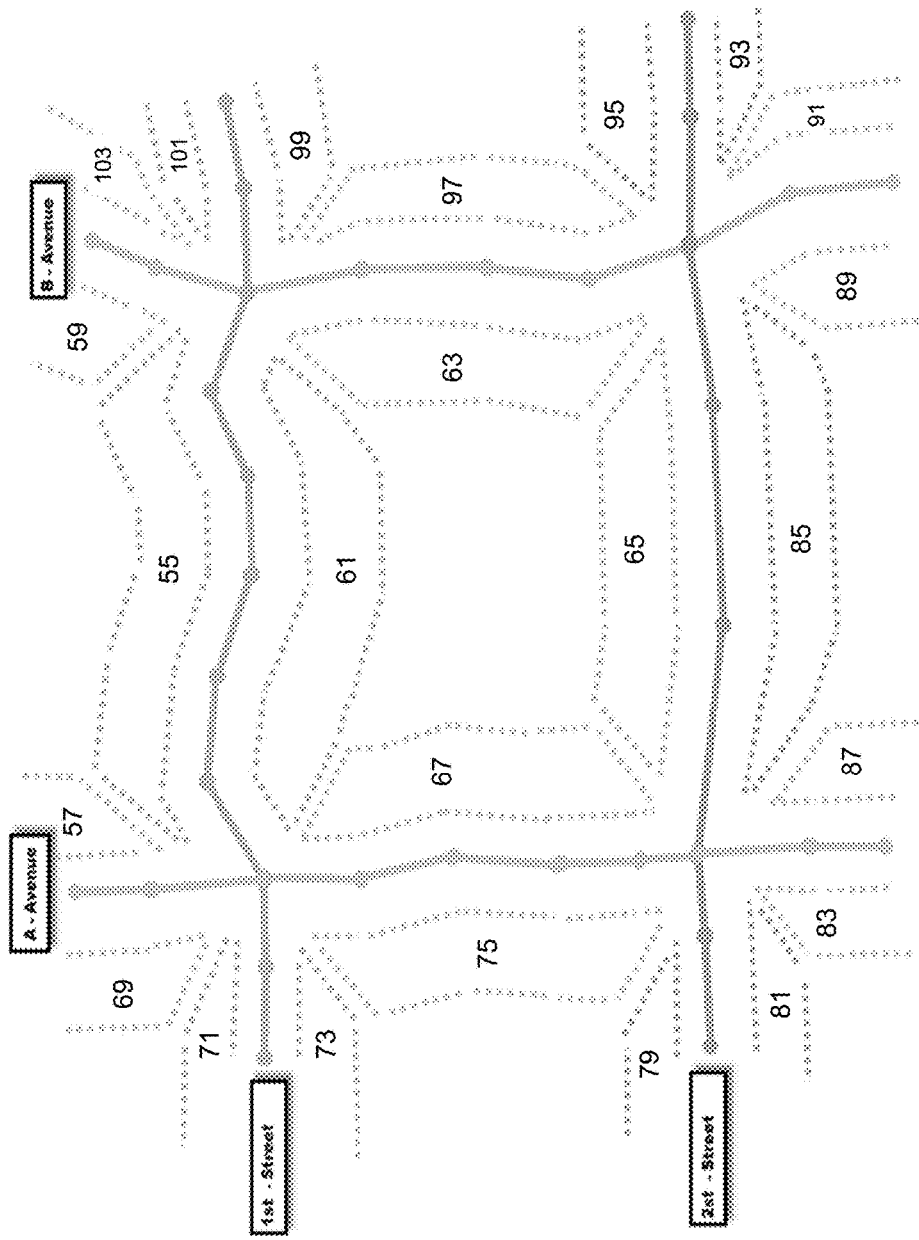
Figure 15:
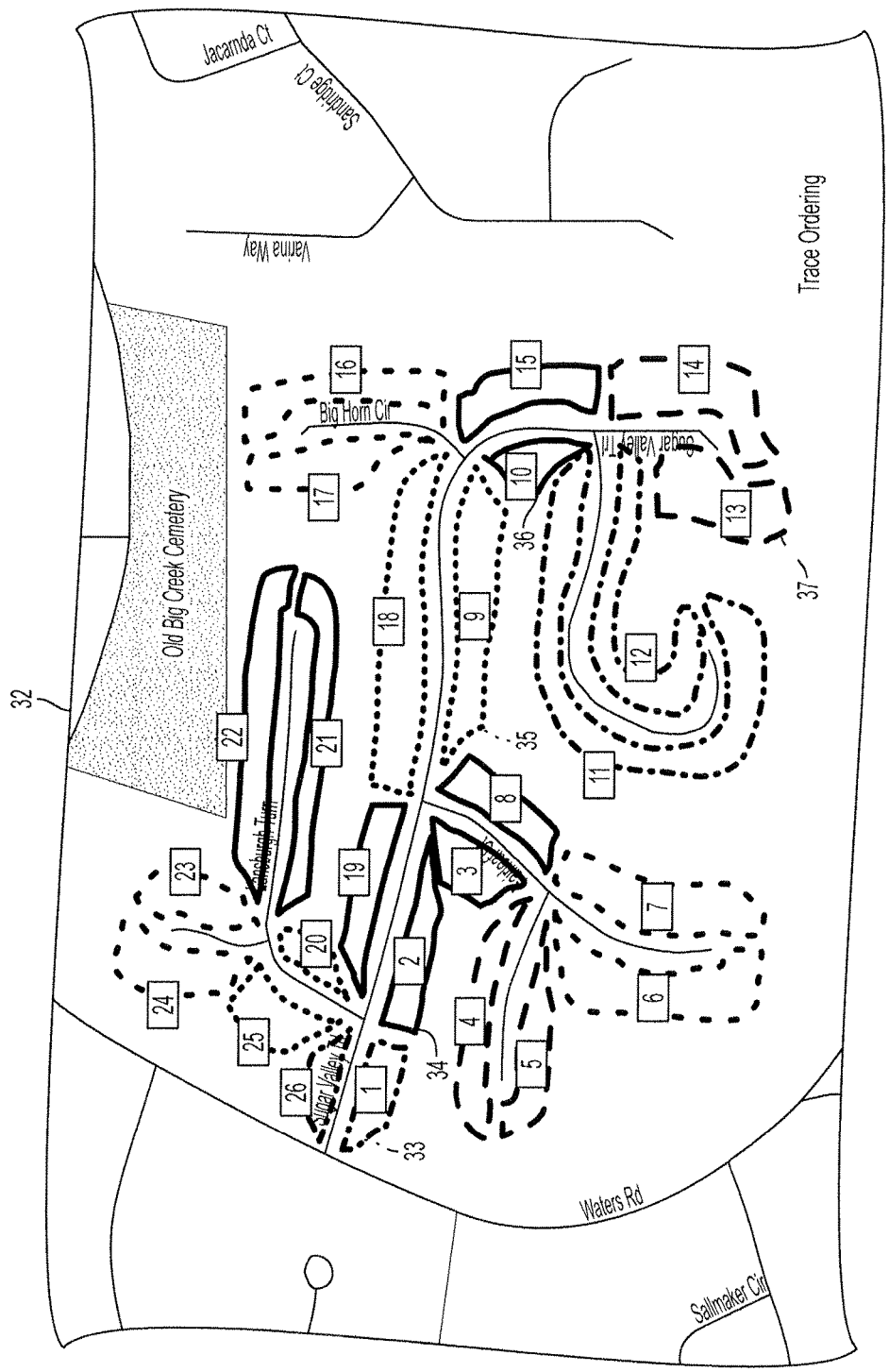
Figure 16:
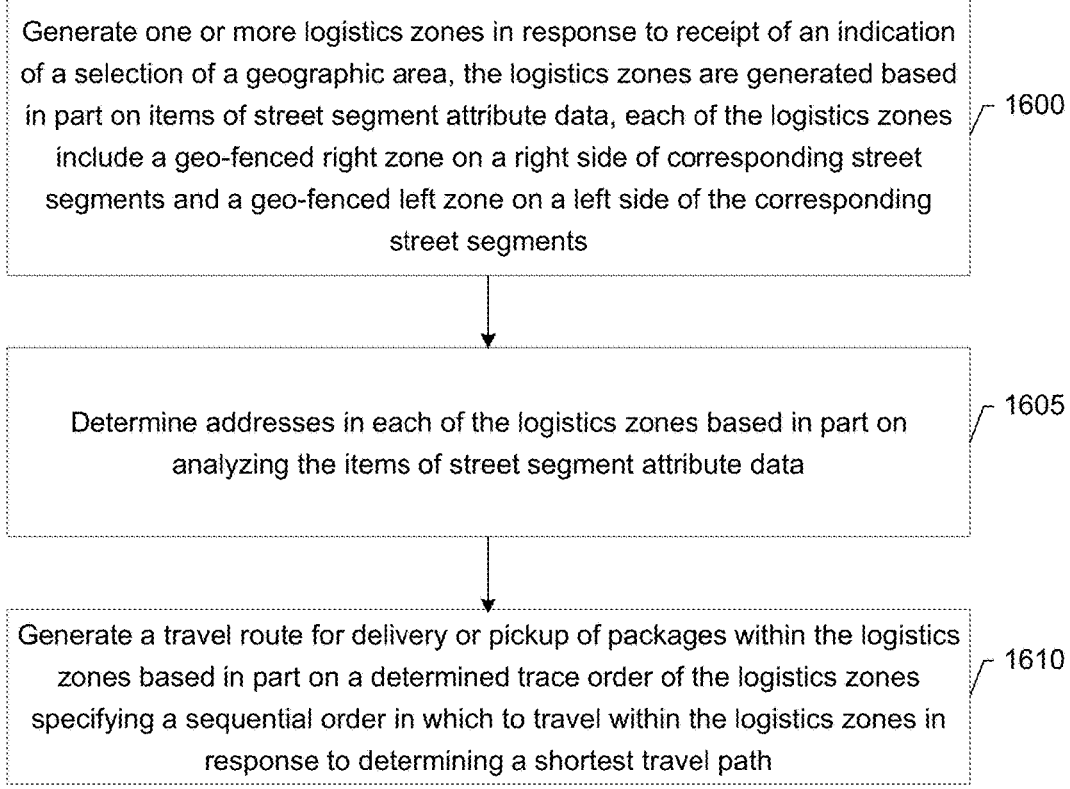

Having thus described the invention in general terms, reference will now be made to the accompanying drawings, which are not necessarily drawn to scale, and wherein:

FIG. 1 is an overview of a system that can be used to practice embodiments of the invention;

FIG. 2 is a schematic diagram of a carrier system according to an exemplary embodiment of the invention;

FIG. 3 is a schematic block diagram of a mobile device in accordance with an exemplary embodiment of the invention;

FIG. 4 is a diagram illustrating a user interface indicating a selection of a geographic area according to an exemplary embodiment of the invention;

FIG. 5A is a diagram illustrating a street segment according to an exemplary embodiment of the invention;

FIG. 5B is a diagram illustrating a node connecting street segments according to an exemplary embodiment of the invention;

FIGS. 6-12 are diagrams illustrating user interfaces according to exemplary embodiments of the invention;

FIG. 13 is a diagram illustrating street segments according to an exemplary embodiment;

FIG. 14 is a diagram illustrating logistics zones according to an exemplary embodiment;

FIG. 15 is a diagram illustrating a trace order of logistics zones according to an exemplary embodiment; and FIG. 16 is a flowchart illustrating operations and processes that may be used in accordance with various embodiments of the invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

Various embodiments provide systems, methods and computer program products that facilitate improved dispatching of resources. In some embodiments, digital maps are analyzed to create road segments with nodes between the segments. Data relating to the segments are also stored in relation to the segments (e.g., addresses, commercial/residential status, etc.) A user may select a geographic area and the system may identify the segments within the selected area. With these segments identified, the system can then identify zones related to the segments (e.g., addresses on the left or right side of a segment, all addresses associated with one or more segments, etc.) and link the associated data with the zones. When dispatching resources, the system may assign zones to the resources and create a suggested sequence for servicing the zones (e.g., a trace route). Work measurements within the zones may also be generated and evaluated such that the workload between the different resources may be balanced. The resources may be personnel, any type of delivery vehicle (e.g., goods, parcels, stocking, taxis, buses) or service vehicle (e.g., refuse collection, meter reader, etc.).

I. EXEMPLARY SYSTEM ARCHITECTURE

The system may include one or more mobile assets 100, one or more carrier systems 110, one or more Global Positioning System (GPS) satellites 115, one or more networks 135, one or more radio frequency identification (RFID) readers/interrogators 140, one or more mobile devices 150, and/or the like as illustrated in FIG. 1. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

a. Exemplary Mobile Asset

In various embodiments, a mobile asset 100 may be a tractor, truck, vehicle, a trailer, a tractor and trailer combination, a van, a flatbed truck, a delivery vehicle, and/or the like. In one embodiment, each mobile asset 100 may be associated with a unique mobile asset identifier (such as a mobile asset ID) that uniquely identifies the mobile asset 100. The mobile asset 100 may be mobile in the sense that it may be able to move from one location to another under its own power. The unique mobile asset ID (e.g., trailer ID, tractor ID, vehicle ID, and/or the like) may include characters, such as numbers, letters, symbols, and/or the like. For example, an alphanumeric mobile asset ID (e.g., "1221A445533AS445") may be associated with each mobile asset 100. In another embodiment, the unique mobile asset ID may be the license plate, registration number, or other identifying information assigned to the mobile asset 100. FIG. 1 represents an embodiment in which the mobile asset 100 is a tractor, a trailer, or a tractor and trailer combination.

FIG. 1 shows one or more computing entities, devices, and/or similar words used herein interchangeably that are associated with the mobile asset 100, such as an information/data collection device 130 or other computing entities. The data collection device 130 that may be attached, affixed, disposed upon, integrated into, or part of a mobile asset 100. The information/data collection device 130 may collect location and telematics information/data and transmit/send the information/data to the mobile device 150, and/or the carrier system 110 via one of several communication methods.

In one embodiment, each mobile asset 100 may have an RFID tag/sensor attached or affixed thereto that stores the corresponding mobile asset ID (e.g., trailer ID, tractor ID, vehicle ID, and/or the like). Such an RFID tag/sensor can be placed inside a mobile asset 100, or affixed to an outer surface of a mobile asset 100, for example. The RFID tags/sensors may be passive RFID tags/sensors, active RFID tags/sensors, semi-active RFID tags/sensors, battery-assisted passive RFID tags/sensors, and/or the like. Thus, the RFID tags/sensors can include some or all of the following components: one or more input interfaces for receiving information/data, one or more output interfaces for transmitting information/data, a processor, a clock, memory modules, and a power source.

In another embodiment, each mobile asset 100 may have its corresponding mobile asset ID (e.g., trailer ID, tractor ID, vehicle ID, and/or the like) visible on the exterior of the mobile asset 100. For example, the license plate number, registration number, alphanumeric characters, or other identifying information may be on the exterior of the mobile asset such that it can be capture (e.g., trailer ID, tractor ID, vehicle ID, and/or the like) and properly identify it via analysis.

b. Exemplary Carrier System

FIG. 2 provides a schematic of a carrier system 110 according to one embodiment of the present invention. In general, the term "system" may refer to, for example, one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier system 110 may also include one or more communications interfaces 320 for communicating with various computing entities, such as by communicating data, content, information, and/or similar terms used herein interchangeably that can be transmitted, received, operated on, processed, displayed (e.g., via display 380), stored, and/or the like. For instance, the carrier system 110 may communicate with mobile assets 100, RFID interrogators/readers 140, mobile devices 150, and/or the like.

As shown in FIG. 2, in one embodiment, the carrier system 110 may include or be in communication with one or more processing elements 305 (also referred to as processors, processing circuitry, and/or similar terms used herein interchangeably) that communicate with other elements within the carrier system 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier system 110 may further include or be in communication with non-volatile memory 310 (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database carrier systems, information/data, applications, programs, program modules, scripts, source code, object code, byte code, compiled code, interpreted code, machine code, executable instructions, and/or the like. The term database, database instance, database carrier system, and/or similar terms used herein interchangeably may refer to a structured collection of records or information/data that is stored in a computer-readable storage medium, such as via a relational database, hierarchical database, and/or network database.

In one embodiment, the carrier system 110 may further include or be in communication with volatile memory 315 (also referred to as volatile storage, memory, memory storage, memory circuitry and/or similar terms used herein interchangeably). In one embodiment, the volatile memory 315 may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database carrier systems, information/data, applications, programs, program modules, scripts, source code, object code, byte code, compiled code, interpreted code, machine code, executable instructions, and/or the like being executed by, for example, the processing element 305. Thus, the databases, database instances, database carrier systems, information/data, applications, programs, program modules, scripts, source code, object code, byte code, compiled code, interpreted code, machine code, executable instructions, and/or the like may be used to control certain aspects of the operation of the carrier system 110 with the assistance of the processing element 305 and operating system.

As indicated, in one embodiment, the carrier system 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the carrier system 110 may communicate with computing entities or communication interfaces of the mobile asset 100 (e.g., tractor, trailer, tractor and/or trailer, delivery vehicle), RFID interrogators/readers 140, mobile devices 150, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier system 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier system 110 may include or be in communication with one or more input elements, such as a keyboard input, a mouse input, a touch screen/display input, audio input, pointing device input, joystick input, keypad input, and/or the like. The carrier system 110 may also include or be in communication with one or more output elements (not shown), such as audio output, video output, screen/display output, motion output, movement output, and/or the like.

In addition to the communication interface(s), the interface(s) may also include at least one user interface that may include one or more earphones and/or speakers, a display 380, and/or a user input interface 382. The user input interface, in turn, may comprise any of a number of devices allowing the carrier system to receive data from a user, such as a microphone, a keypad, keyboard, a touch display, a joystick, image capture device, pointing device (e.g., mouse), stylus or other input device.

As will be appreciated, one or more of the carrier system's 110 components may be located remotely from other carrier system 110 components, such as in a distributed system. Furthermore, one or more of the components may be combined and additional components performing functions described herein may be included in the carrier system 110. Thus, the carrier system 110 may be adapted to accommodate a variety of needs and circumstances.

In an exemplary embodiment, the processing element 305 may be in communication with and may otherwise control a logistics zone module 378. The logistics zone module 378 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the logistics zone module 378, as described below. In examples in which software is employed, a device or circuitry (e.g., processing element 305 in one example) executing the software forms the structure associated with such means. As such, for example, the logistics zone module 378 may be configured to, among other things, facilitate generation of one or more logistics zones for delivery or pickup of one or more packages, as described more fully below.

c. Exemplary Mobile Device

FIG. 3 provides an illustrative schematic representative of a mobile device 150 (e.g., in-mobile-asset device, FDT2 device) that can be used in conjunction with embodiments of the present invention. Mobile devices 150 can be operated by various parties, including operators of mobile assets 100. As shown in FIG. 3, a mobile device 150 (e.g., in-mobile-asset device, FDT2 device, etc.) can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as mobile assets 100, carrier system 110, RFID interrogators/readers 140, and/or the like. In this regard, the mobile device 150 (e.g., in-mobile-asset device, FDT2 device, etc.) may be capable of operating with one or more air interface standards, communication protocols, modulation types, and access types. More particularly, the mobile device 150 (e.g., in-mobile-asset device, FDT2 device, etc.) may operate in accordance with any of a number of wireless communication standards and protocols. In a particular embodiment, the mobile device 150 (e.g., in-mobile-asset device, FDT2 device, etc.) may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

According to one embodiment, the mobile device 150 (e.g., in-mobile-asset device, FDT2 device, etc.) may include a location determining device and/or functionality. For example, the mobile device 150 (e.g., in-mobile-asset device, FDT2 device, etc.) may include a GPS module adapted to acquire, for example, latitude, longitude, altitude, geocode, course, and/or speed data. In one embodiment, the GPS module acquires information/data, sometimes known as ephemeris information/data, by identifying the number of satellites in view and the relative positions of those satellites.

The mobile device 150 (e.g., in-mobile-asset device, FDT2 device, etc.) may also comprise a user interface (that may include a display 416 coupled to a processing element 408) and/or a user input interface (coupled to a processing element 408). The user input interface can comprise any of a number of devices allowing the mobile device 150 (e.g., in-mobile-asset device, FDT2 device, etc.) to receive information/data, such as a keypad 418 (e.g., hard or soft), a touch display, voice or motion interfaces, a barcode reader, a RFID tag reader, and/or other input device. In embodiments including a keypad 418, the keypad 418 can include (or cause display of) the conventional numeric (0-9) and related keys (#, *), and other keys used for operating the mobile device 150 (e.g., in-mobile-asset device, FDT2 device, etc.) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 150 (e.g., in-mobile-asset device, FDT2 device, etc.) can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database carrier systems, information/data, applications, programs, program modules, scripts, source code, object code, byte code, compiled code, interpreted code, machine code, executable instructions, and/or the like to implement the functions of the mobile device 150 (e.g., in-mobile-asset device, FDT2 device, etc.).

II. EXEMPLARY SYSTEM OPERATION

Reference will now be made to example embodiments of a system for generating one or more logistics zones. The logistics zones and associated data (e.g., street segment attribute data) may be utilized in part to perform shipping tasks such as, for example, generating shipping routes, routing plans, dispatch plans, handling instructions and other suitable tasks, as described more fully below.

a. Generating Logistics Zones

Referring now to FIG. 4, a diagram illustrating a zone of interest is provided according to an exemplary embodiment. In the example embodiment of FIG. 4, the logistics zone module 378 may receive input of a selection of a zone of interest 3 and may increase/expand the visible indicia denoting the zone of interest in a pop-up window 5. The selection of the areas of interest may be received via a user input interface (e.g., user input interface 382) in response to a user selecting the zone of interest 3. The logistics zone module 378 may generate one or more logistic zones based in part on one or more street segment attributes and/or definitions, as described more fully below.

Referring now to FIGS. 5A and 5B, diagrams illustrating street segments and a node connecting street segments are provided according to an exemplary embodiment. The logistics zones of the exemplary embodiments may be generated based in part on street segment attributes and/or definitions and in this regard the logistics zones may define one or more geographies that include addresses, as described more fully below.

In the example embodiment of FIG. 5A, the logistics zone module 378 may generate a street segment 7 having multiple points (e.g., six points). In some example embodiments, a street segment may include two points (e.g., a From Point and To Point). The logistics zone module 378 may generate the street segment 7 in response to receipt of an indication of a selection of a street(s) (e.g., from a digital map). The logistics zone module 378 may determine the longitude and latitude coordinates of the points of a street segment (e.g., street segment 7).

In an example embodiment, the logistics zone module 378 may define street segment attributes and/or definitions for a street segment(s) (e.g., street segment 7) including, but not limited to: (1) City—City Right (e.g., a city on the right side of the segment (e.g., Atlanta, Ga.)), City Left (e.g., a city on the left side of the segment) (e.g., Norcross, Ga.) (e.g., in some instances the city on the right of the segment and the left of the segment may be the same city); (2) Classification—Interstate, Local Road, Highway, Primary Road, etc.; (3) Country—Country Left, Country Right; (4) Default Name (e.g., Peachtree Street, etc.); (5) Direction—One way, Two way, etc.; (6) Distance—Distance of the segment (e.g., street segment 7) in miles/kilometers (e.g., distance between each segment, distance between From Point and To Point, etc.); (7) Elevation—To Elevation (e.g., the To Point is on a flat road), From Elevation (e.g., the From Point is on a Ramp); (8) From Point (e.g., starting longitude and latitude point), To Point (e.g., ending longitude and latitude point); (9) Identification (ID)—Unique ID number; (10) High Address Number—High Address Right (e.g., the high address on the right side of the segment), High Address Left (e.g., the high address on the left side of the segment); (11) Low Address Number—Low Address Right (e.g., low address on the right side of the segment), Low Address Left (e.g., low address on the left side of the segment); (12) Points—Longitude and Latitude points (e.g., coordinates) in order (e.g., From Point—To Point) that determine a segment (e.g., street segment 7); Postal Code—Postal Code Right, Postal Code Left; (13) Street Prefix—Street Prefix Right, Street Prefix Left (e.g., N, S, E, W, etc.); (14) Street Suffix Street Suffix Right, Street Suffix Left (e.g., W, NE, SE, NW, etc.); (15) Street Type—Road (RD), Avenue (AVE), Drive (DR), Boulevard (BLVD), etc.; (16) Time—Time to travel the street segment (e.g., street segment 7); (17) Weight—Maximum weight allowed (e.g., for a given street corresponding to a street segment) in pounds (lbs.) or kilograms; or (18) any other suitable street segment attributes and/or definitions data (e.g., location data (e.g., longitude and latitude coordinates) of doors of houses and/or buildings along a street segment(s)). The defined street segment attributes and/or definitions for the street segments may be stored in a memory (e.g., non-volatile memory 310, volatile memory 315).

As shown in FIG. 5B, a node (e.g., node 9 (e.g., an intersection)) may connect segments (e.g., segment 2, segment 4). The nodes may be associated with information indicating the segments that connect with the respective nodes. The logistics zone module 378 may generate logistics zones based in part on the street segment attributes and/or definitions associated with segments and nodes. Additionally, the logistics zone module 378 may determine a travel path (e.g., a delivery route) based in part on evaluating the distance between one or more nodes.

Figure 6:
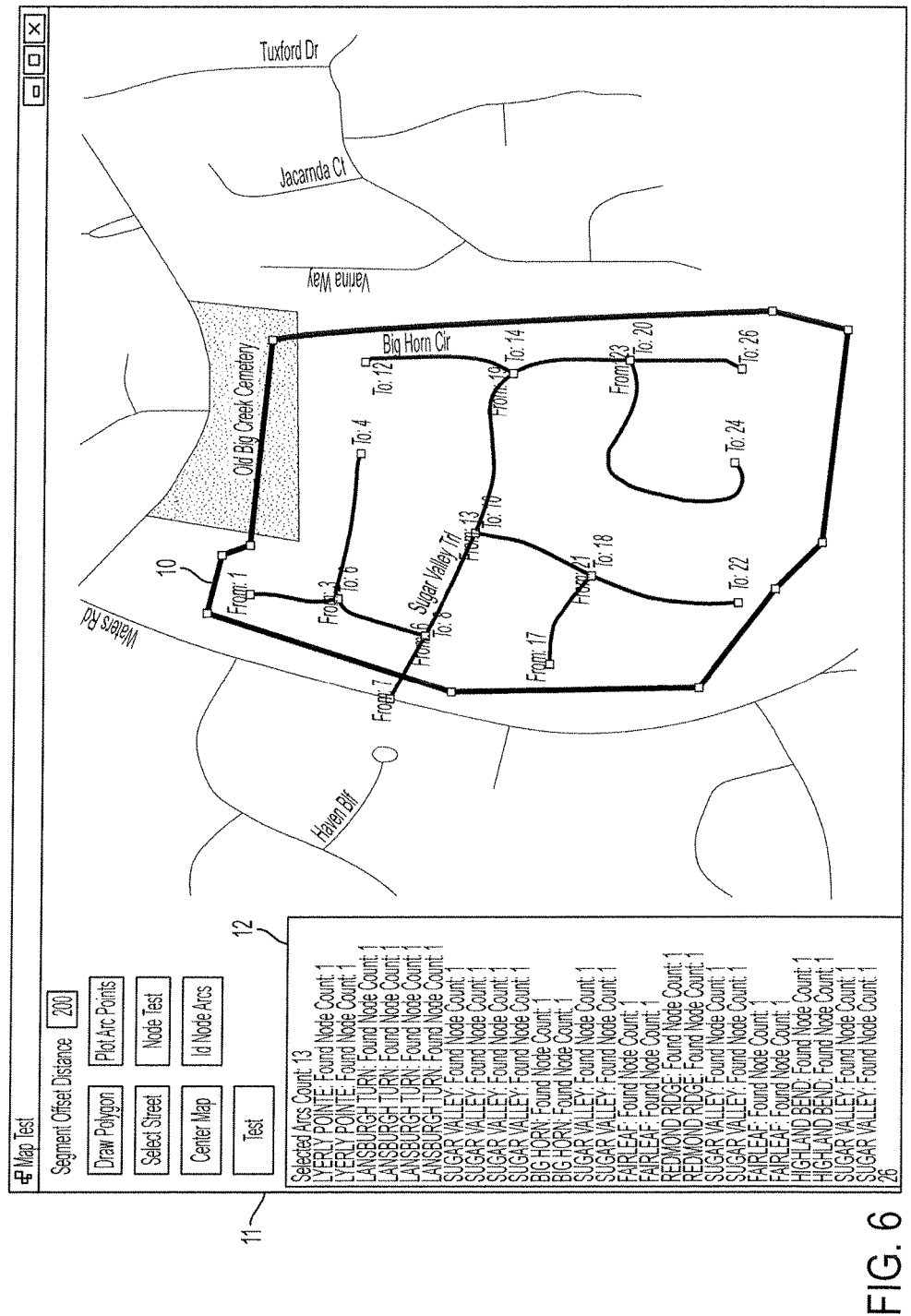

Referring now to FIG. 6, a diagram illustrating a user interface for selecting a geographic area including street segments and nodes is provided according to an exemplary embodiment. In the example embodiment of FIG. 6, the logistics zone module 378 may define a geo-fence 10 (also referred to herein as geo-fence area 10) on a map of the user interface 11 in response to receipt of input of a selection of a geographic area. The receipt of the input of the selection of the geographic area may be in response to receipt of a selection by a user via the user input interface (e.g., user input interface 382). For instance, in some example embodiments, the user may utilize a pointer of the user input interface (e.g., user input interface 382) to draw a circle or lasso around a geographic area of interest to trigger the logistics zone module 378 to generate a geo-fence (e.g., geo-fence 10). In response to selecting the geographic area, the logistics zone module 378 may identify and trace the corresponding street segments of the geo-fence 10. In addition, the logistics zone module 378 may determine the nodes of the geo-fence 10 and may indicate the nodes on the geo-fence 10. The nodes may occur at intersections (e.g., node 14) and endpoints (e.g., node 26) of the street segments. The logistics zone module 378 may also include items of visible indicia 12 identifying the street segments.

Figure 7:
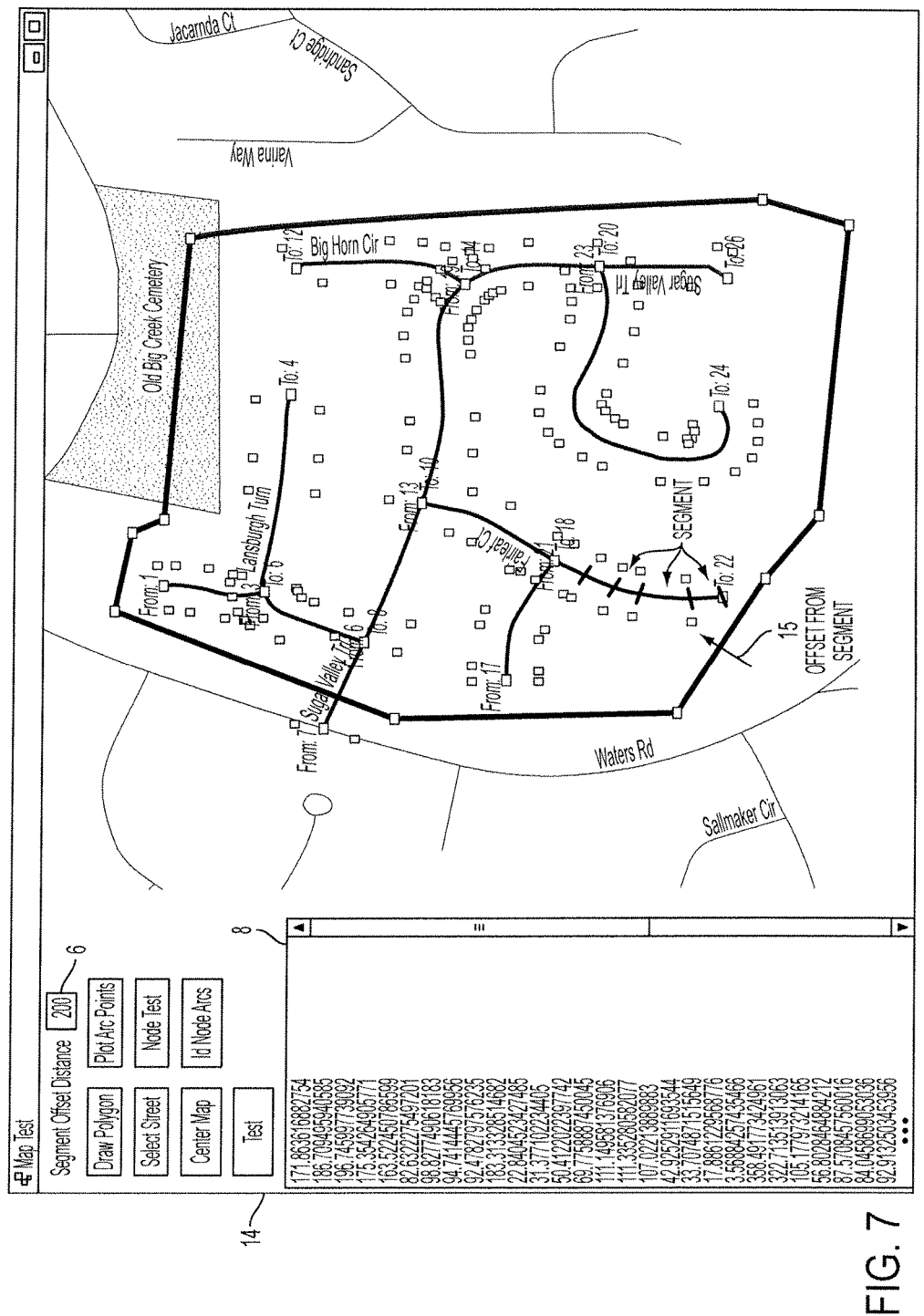

Referring now to FIG. 7, a diagram illustrating a user interface for generating offset points of street segments is provided according to an exemplary embodiment. In the example embodiment of FIG. 7, the logistics zone module 378 may generate the user interface 14 in response to receipt of an indication 6 of an offset distance (e.g., 200 feet) from each of the segments (e.g., From point 21—To Point 22, From Point 3—To Point 4, etc.) in which to generate a logistics zone.

The logistics zone module 378 may also determine the longitude and latitude coordinates of the offset points (e.g., offset point 15) and may include items of visible indicia 8 in the user interface 14 specifying the longitude and latitude coordinates.

Figure 8:
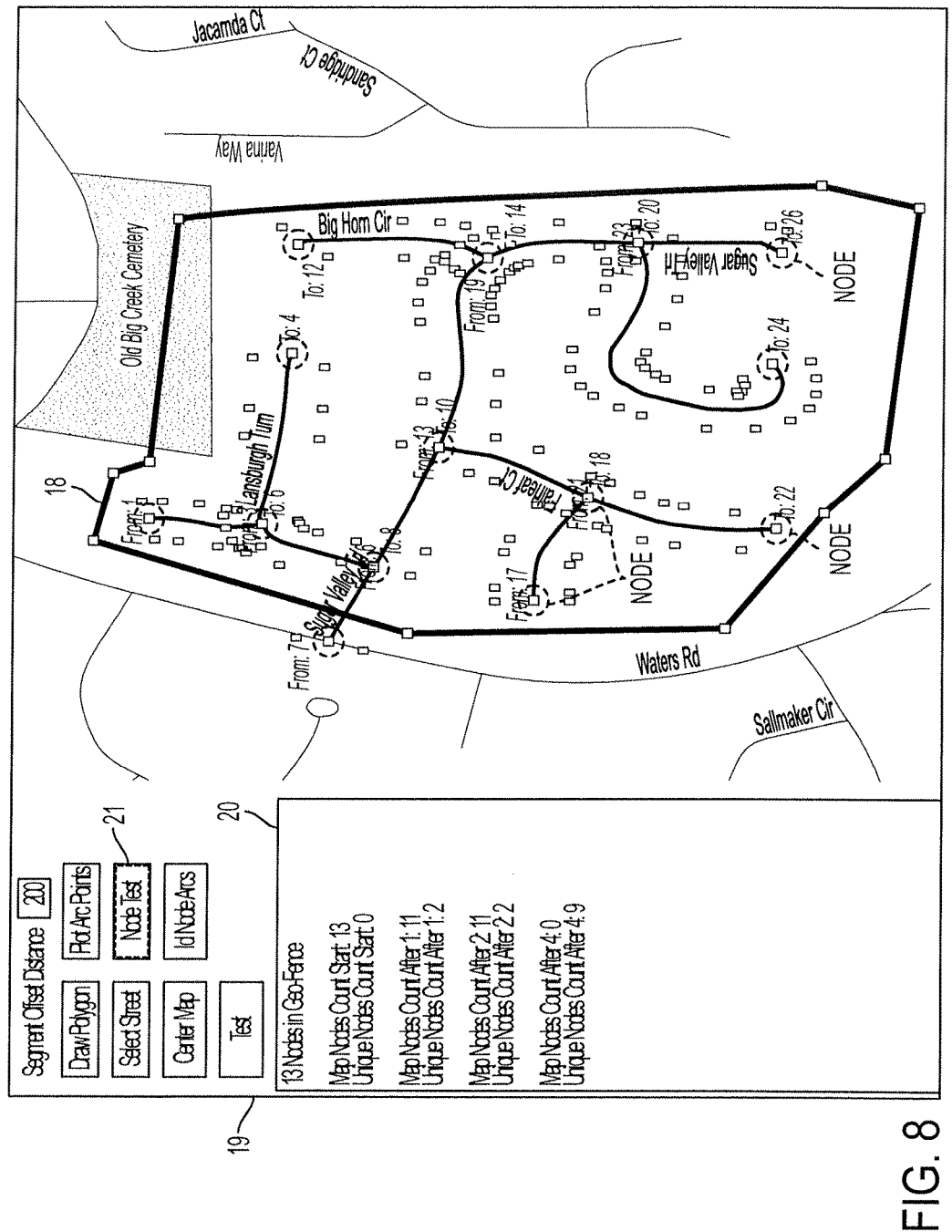

Referring now to FIG. 8, a diagram illustrating a user interface indicating the nodes of a geo-fence is provided according to an exemplary embodiment. In the example embodiment of FIG. 8, the logistics zone module 378 determined that there were thirteen nodes in the geo-fence 18 (e.g., geo-fence 10). In this regard, the logistics zone module 378 included visible indicia 20 indicating the nodes of the geo-fence 18 in the user interface 19. The logistics zone module 378 may determine the nodes of the geo-fence 18 in response to receipt of an indication of a selection of a node test tab 21.

Figure 9:
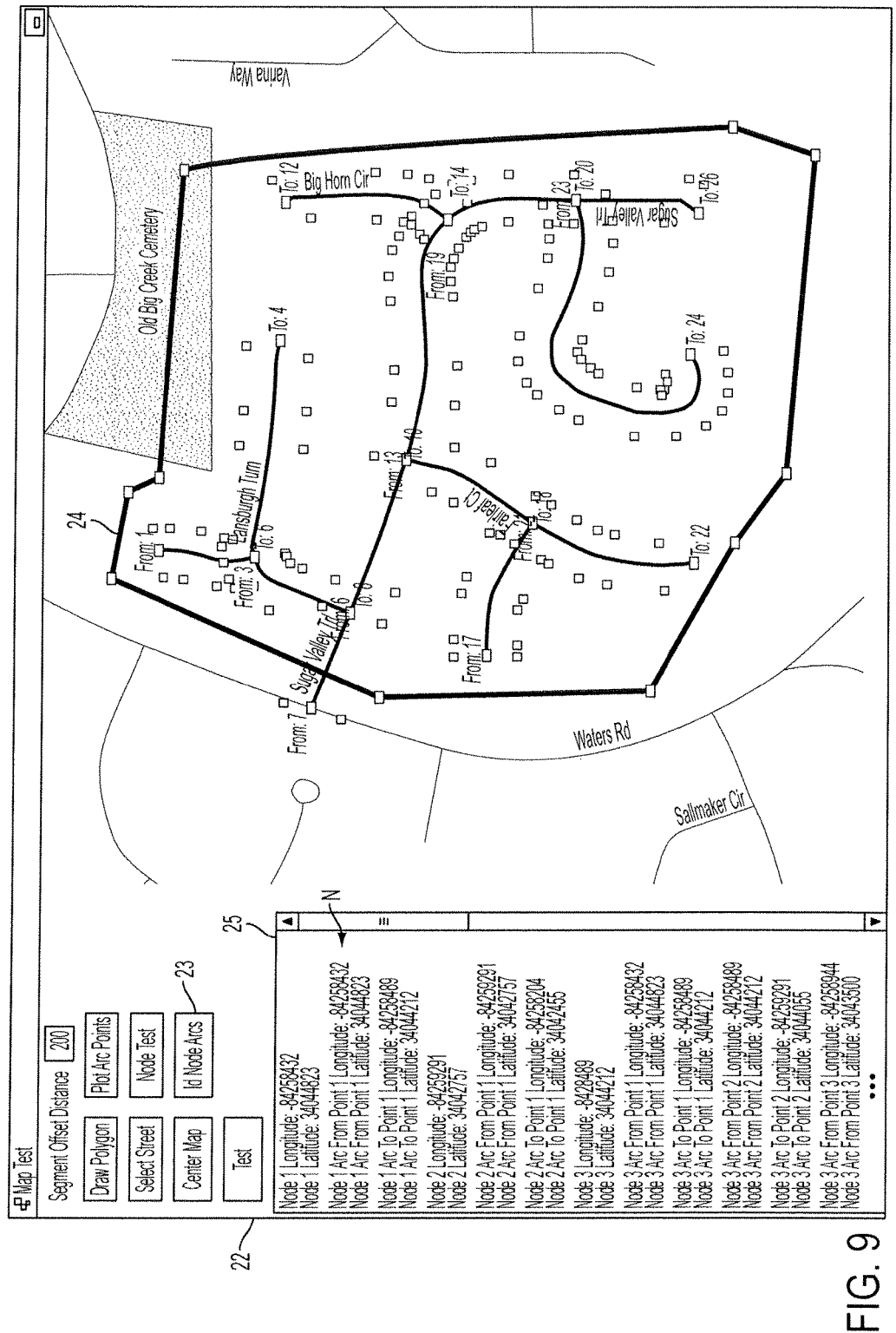

Referring now to FIG. 9, a diagram illustrating a user interface for determining node headings is provided according to an exemplary embodiment. In the exemplary embodiment of FIG. 9, the logistics zone module 378 may generate the user interface 22 in response to a receipt of an indication of a selection of the Id node arcs tab 23. The logistics zone module 378 may determine the node headings (e.g., direction (e.g., North)) of a geo-fence (e.g., geo-fence 24) based in part on the longitude and latitude coordinates of the nodes. The logistics zone module 378 may include visible indicia 25 indicating the longitude and latitude coordinates of the nodes in the user interface 22. For purposes of illustration and not of limitation, the logistics zone module 378 determined that the node heading for Node 1 Arc From Point 1 is a North (N) direction.

Figure 10:
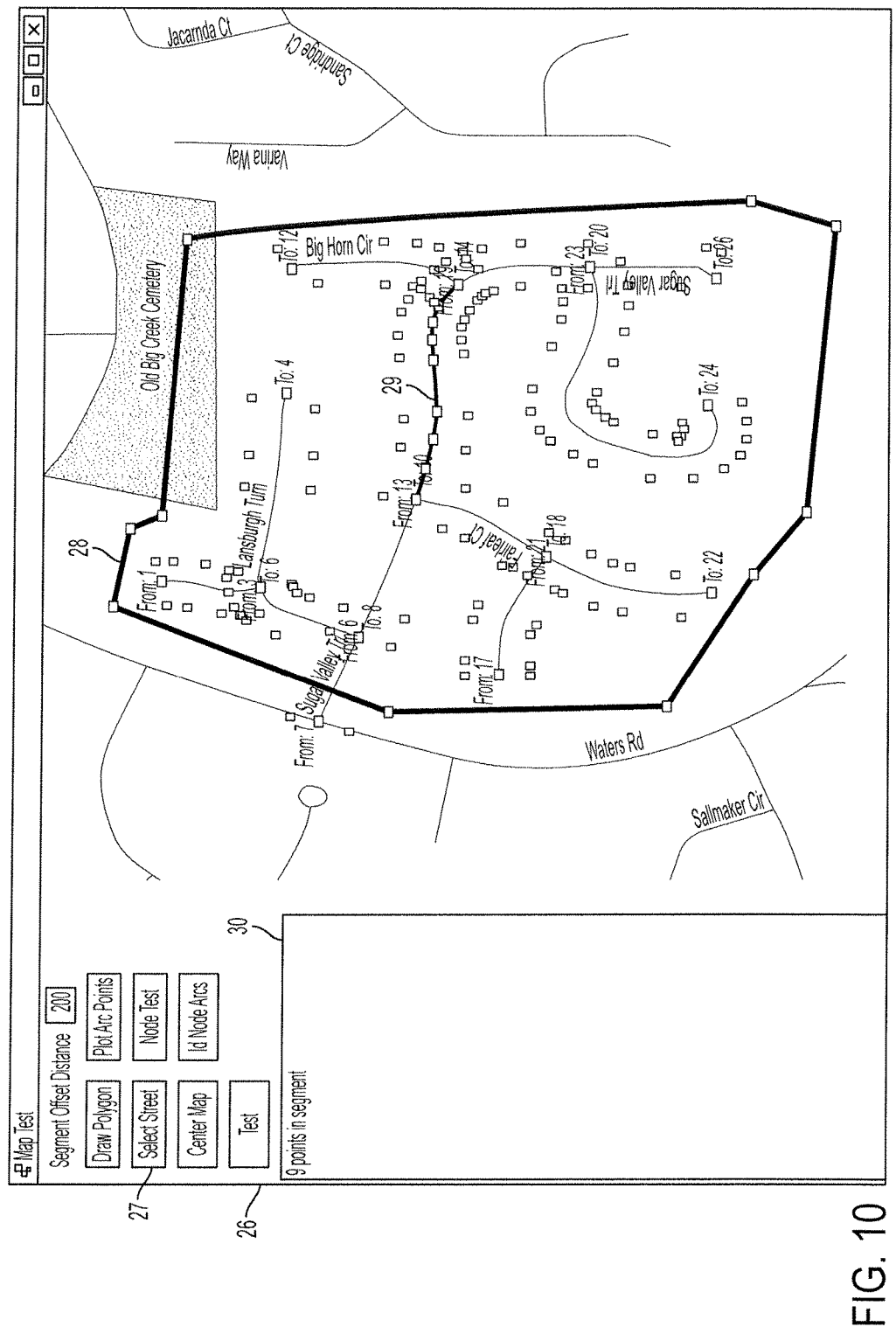

Referring now to FIG. 10, a diagram illustrating a user interface for selecting a street segment(s) is provided according to an exemplary embodiment. In the exemplary embodiment of FIG. 10, the logistics zone module 378 may generate the user interface 26 in response to a receipt of an indication of a selection of the select street tab 27. The logistics zone module 378 may indicate a selection of a street segment(s) (e.g., street segment 29) of a geo-fence (e.g., geo-fence 28) in response to receipt of an indication that the street segment (e.g., street segment 29) was chosen. In the example embodiment of FIG. 10, the logistics module 378 may include visible indicating the points along the selected street segment 29 and may include visible indicia 30 in the user interface 26 indicating the number (e.g., 9) of points on the selected segment 29.

Figure 11:
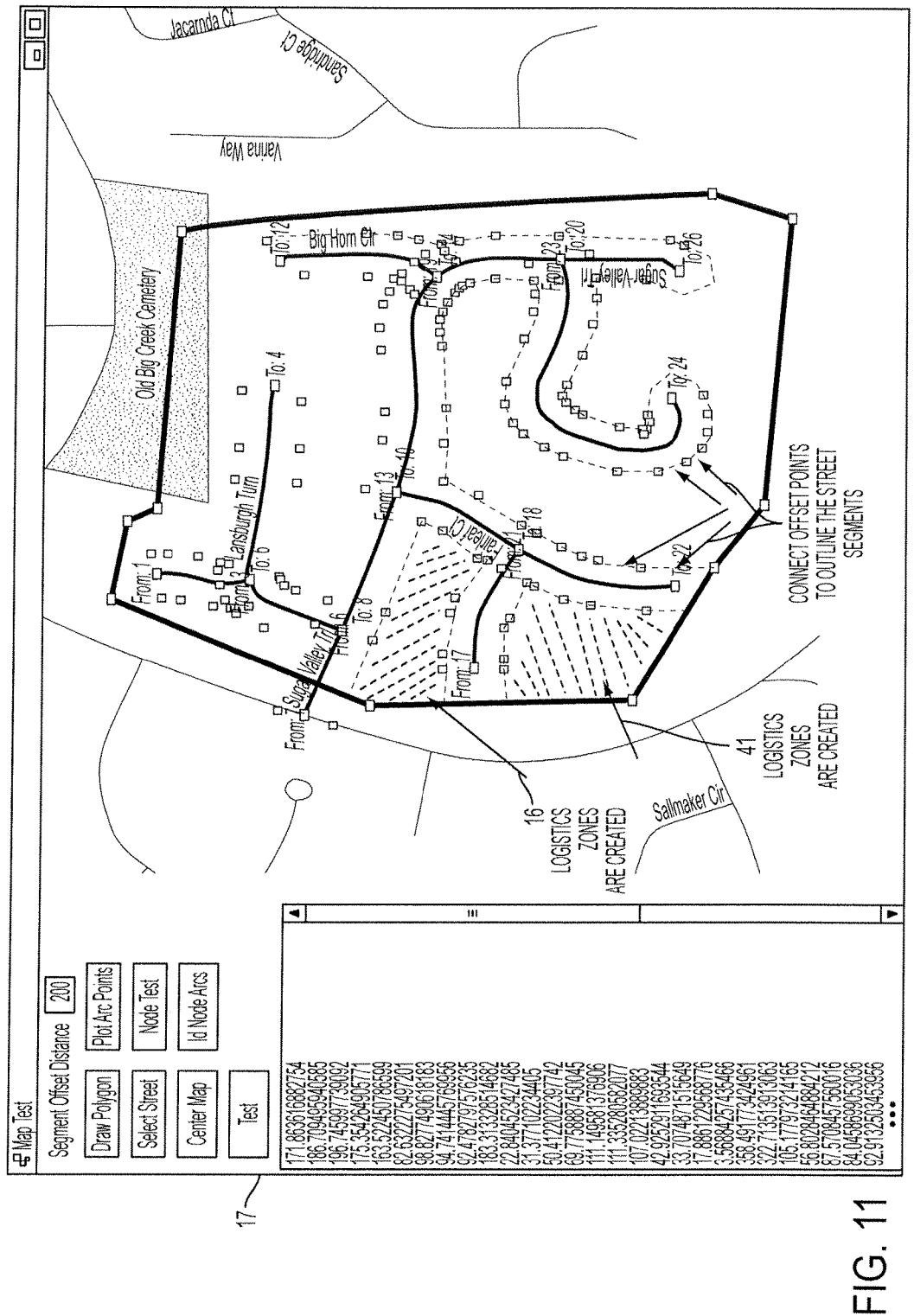

Referring now to FIG. 11, a diagram illustrating a user interface for generating logistics zones is provided according to an exemplary embodiment. In the example embodiment of FIG. 11, the logistics zone module 378 may generate the user interface 17 in response to creating the offset points from each of the segments of a selected geographic area. The logistics zone module 378 may generate one or more logistics zones (e.g., logistics zone 16, logistics zone 41) based in part on connecting the offset points. The logistics zone 16 may be a geo-fenced zone on a left side of a street and the logistics zone 18 may be a geo-fenced zone on a right side of the street. The logistics zones (e.g., logistics zone 16, logistics zone 41), generated by the logistics zone module 378, may include all addresses in the geo-fenced area of the respective logistics zones. The logistics zone module 378 may determine the addresses for the logistics zones based in part on analyzing the address information associated with the street segment attributes and/or definition data.

In one example embodiment, in response to receipt of an indication of a lasso or a circle around a geographic area that includes street segments of the area, the logistics zone module 378 may automatically create a (e.g., geo-fence 10), and the logistics zones (e.g., logistics zone 16, logistic zone 41) of the geo-fence.

Figure 12:
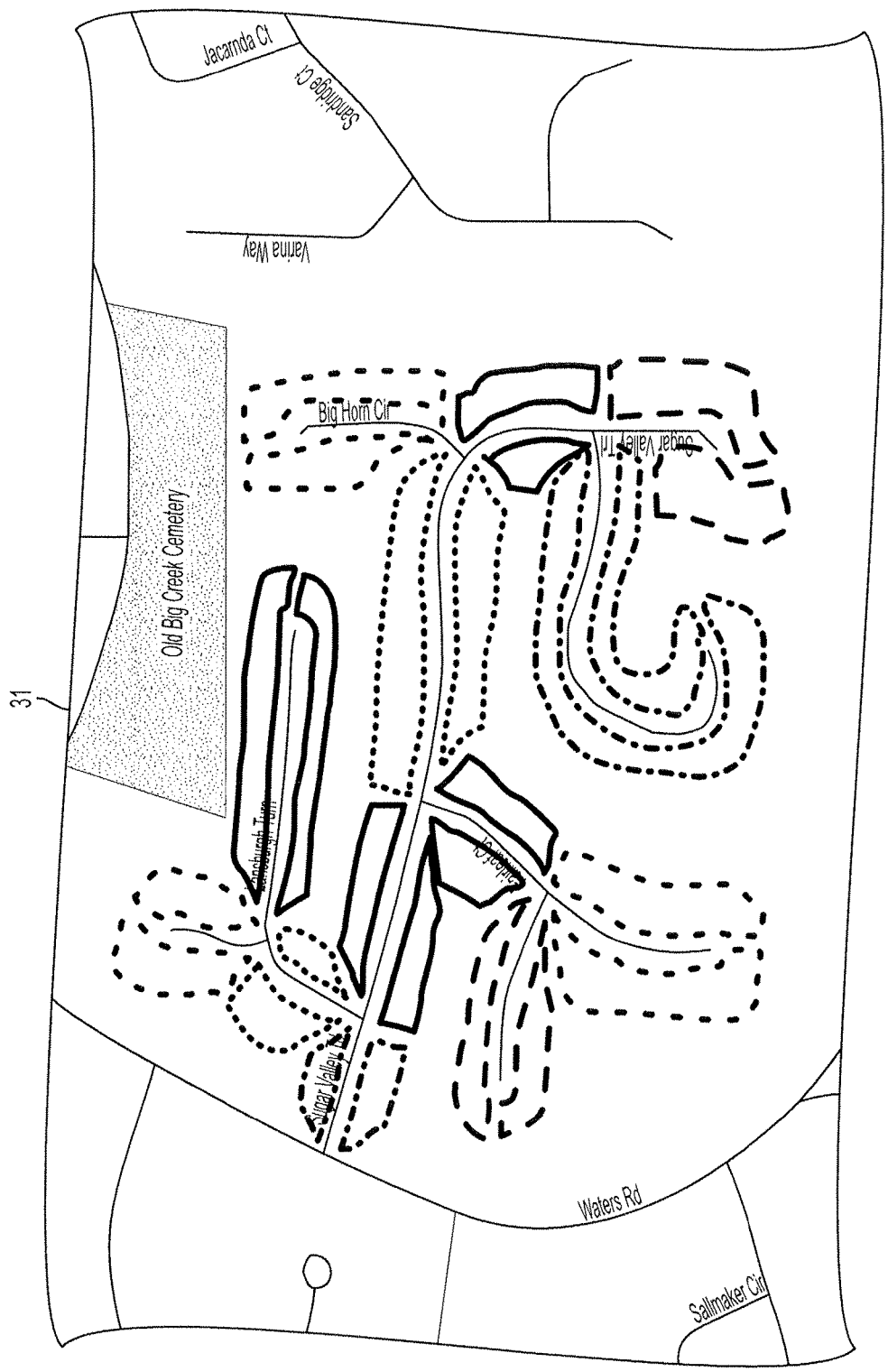

Referring now to FIG. 12, a diagram illustrating logistics zones is provided according to an exemplary embodiment. In the example embodiment of FIG. 12, the logistics zone module 378 may generate right and left logistics zones of each of the street segments for a geo-fence (e.g., geo-fence 10) area in a user interface 31. The right and left logistics zones of each of the street segments may be generated based in part on offset points from each of the street segments, in the manner described above. The logistics zone module 378 may determine the addresses for each of the logistics zones based in part on analyzing the address information associated with the street segment attributes and/or definition data.

Referring now to FIG. 13, a diagram illustrating street segments utilized in part to generate one or more logistics zones is provided. In the example embodiment of FIG. 13, the logistics zone module 378 may analyze the street segments such as 1st street, 2nd street, A-Avenue and B-Avenue to define logistics zones. The street segments such as 1st street, 2nd street, A-Avenue and B-Avenue include segments (e.g., segments 51, 53) and nodes (e.g., nodes 43, 45, 47, 49) and are associated with street segment attributes and/or definitions data. In the example embodiment of FIG. 13, the logistics zones module 378 may generate an offset distance (e.g., 200 feet) from the respective street segments (e.g., 1st street, 2nd street, A-Avenue and B-Avenue) to generate one or more logistics zones as described more fully below with respect to FIG. 14.

Referring now to FIG. 14, a diagram illustrating one or more logistics zones is provided. In the example embodiment of FIG. 14, the logistics zone module 378 may generate logistics zones that are offset a distance (e.g., 200 feet) from street segments (e.g., 1st street, 2nd street, A-Avenue and B-Avenue). For instance, in the example embodiment of FIG. 5, the logistics zone module 378 may generate logistics zones 55, 57, 59, 61, 63, 65, 67, 69, 71, 73, 75, 77, 79, 81, 83, 85, 87, 89, 91, 93, 95, 97, 99, 101 and 103 that may be offset from a distance (e.g., 200 feet) from respective street segments. The logistics zone module 378 may determine the addresses for each of the logistics zones based in part on analyzing address information associated with the street segment attributes and/or definition data.

The logistics zone module 378 may generate one or more unique handling instructions (e.g., human readable handling instructions) and codes for one or more of the logistics zones. The handling instructions may include data specifying packages for delivery and/or pickup at addresses in corresponding logistics zones.

In some example embodiments, the logistics zone module 378 may facilitate grouping of logistics zones (e.g., logistics zones 61, 63, 65 and 67) together to form larger logistics zones or geo-fenced areas. In this manner, the logistics zone module 378 may group information together to enhance a dispatch process. For instance, the logistics zone module 378 may generate a dispatch plan for the larger group of logistics zones in response to receipt of an indication of a selection of the group of logistics zones. As logistics zones are grouped together by the logistics zone module 378, the logistics zone module 378 may assign a particular sequence that provides information regarding the order in which logistics zones of the group of logistics zones are assigned for delivery or pickup of packages. Additionally, the logistics zone module 378 may generate an order for delivery or pickup of packages for each address or building inside a logistics zone of the group of logistics zones. The logistics zone module 378 may also assign one or more priorities to a particular logistics zone(s). The priorities may be based on delivery times for packages within the zones or other reasons.

b. Utilizing Logistics Zones in Part to Generate Routes, Instructions & Determine Other Data Referring now to FIG. 15, a diagram illustrating a trace ordering is provided according to an exemplary embodiment. In the example embodiment of FIG. 15, the logistics zone module 378 may generate a trace ordering for the generated logistics zones in the user interface 32. The trace ordering generated by the logistics zone module 378 may be determined based in part on the logistics zones module 378 calculating the shortest travel path in the generated logistics zones (e.g., between zones, within zones, etc.). The logistics zone module 378 may determine the shortest travel path based in part on utilizing the information indicating the distance of the street segments and the time to travel the street segments that is associated with the street segment attributes and/or definitions data. In the example embodiment of FIG. 15, the logistics zone module 378 determined a trace order of 1 through 26 traces for the logistics zones.

In one example embodiment, the trace order generated by the logistics zone module 378 may be designated as travel route for a vehicle (e.g., mobile asset 100) to deliver or pickup packages in the logistics zones. As such, in this example embodiment, the logistics zone module 378 may generate routing instructions based on the trace order (e.g., trace order 1-26) which may instruct a driver of the vehicle (e.g., mobile asset 100) to deliver or pickup packages in the geographic area (e.g., geo-fence 10) of the logistics zones according to the trace order. The logistics zone module 378 may send the routing instructions to a mobile device (e.g., mobile device 150) of the driver of the vehicle. In this manner, the mobile device (e.g., mobile device 150) may show (e.g., via display 416) the routing instructions to the driver during travel of the route.

In another example embodiment, the logistics zone module 378 may determine a trace order for a subset of the logistics zones of the user interface 32 in response to receipt of an indication of a selection of the subset. For purposes of illustration and not of limitation, in response to receipt of an indication of a selection of logistics zones 33, 34, 35, 36 and 37, the logistics zone module 378 may determine a trace order of 1, 2, 9, 10 and 13 for a travel route for delivery or pickup of packages. In this regard, the logistics zone module 378 may generate routing instructions based on this trace order (e.g., trace order 1, 2, 9, 10 and 13) which may be sent to a mobile device (e.g., mobile device 150) of a driver and as such the driver may travel along a path starting from trace 1 to trace 2, trace 9, trace 10 and trace 13. As such, for delivery or pickup of packages in logistics zones 33, 34, 35, 36, and 37, the driver may utilize the vehicle (e.g., mobile asset 100) to travel along the route per the defined trace order (e.g., trace order 1, 2, 9, 10 and 13).

In an instance in which addresses remain the same (e.g., new houses are not built in the area) for a geographic area (e.g., geo-fence 10), the logistics zone module 378 may reuse the trace order (e.g., trace order 1-26) for subsequent travel along the route without regenerating the trace order. On the other hand, in an instance in which the logistics zone module 378 detects that one or more addresses of the geographic area (e.g., geo-fence 10) has changed since a previously generated trace order, the logistics zone module 378 may regenerate a trace order and route for the geographic area.

The logistics zone module 378 may determine the planned travel miles for a route based in part on the trace order of the logistics zones. For instance, the logistics zone module 378 may analyze the distances of each of the street segments of the trace order (e.g., trace order 1-26) based in part on analyzing the street segment attributes and/or definition data and may determine the total planned miles for the route by adding the distances of each of the street segments corresponding to the logistics zones of the trace order of the route. In addition, logistics zone module 378 may determine the planned travel time for a route based in part on analyzing the time to travel of each of the street segments in the street segment attributes and/or definition data. In this regard, the logistics zone module 378 may determine the total travel time for a route by adding the times of each of the street segments corresponding to the logistics zones of the trace order of the route.

The logistics zones module 378 may generate one or more dispatch plans based in part on the logistics zones and a trace order for a travel route (e.g., delivery route). For example, the logistics zones module 378 may utilize the data associated with the logistics zones to generate and schedule one or more dispatch plans that directs the sequence in which to pickup and/or to deliver packages in a designated geographical area (e.g., geo-fence area 10). In this regard, for example, the logistics zones module 378 may generate a dispatch plan for a geographical area for a route (e.g., based on a trace order of logistics zones) for delivery or pickup of packages in one or more logistics zones (e.g., logistics zones 33, 34, 35, 36, and 37). The logistics zones module 378 may include data in the dispatch plan(s) indicating the service sequence (e.g., delivery sequence) for the addresses of the logistics zones along the route.

In addition, the logistics zones module 378 may generate one or more handling instructions based on the logistics zones of a route (e.g., delivery route). For instance, the handling instructions may be generated by the logistics zones module 378 to route one or more packages to a position within a hub facility (e.g., shipping warehouse) for directing the package to a next location along a delivery route. Additionally or alternatively, the handling instructions may be generated by the logistics zone module 378 to facilitate pre-load of a package(s) in a vehicle (e.g., mobile asset 100) for delivery to the final delivery destination of the package. In this regard, the handling instruction(s) may identify a package(s) and a load position in the vehicle (e.g., mobile asset 100) for the package(s). By analyzing data of the logistics zones associated with a trace order for a delivery route, the logistics zones module 378 may determine the position and location in which one or more packages for the route (e.g., a delivery or pickup route) should be placed on a vehicle. For purposes of illustration and not of limitation, the logistics zone module 378 may analyze the data (e.g., a trace order) of the logistics zones and determine that 1-10 are designated for delivery to zone 33 which may be a first stop (e.g., a first delivery stop) along a route (e.g., based on trace order 1, 2, 9, 10 and 13). In this regard, for example, the logistics zones module 378 may generate a handling instruction(s) designating that packages 1-10 are to be placed on shelves of the vehicle (e.g., mobile asset 100 (e.g., a truck)) near an exit door of the vehicle so that the packages (e.g., packages 1-10) may be easily retrieved since the packages are delivered at the first stop in a logistics zone (e.g., logistics zone 33) of the route (e.g., a route based on trace order 1, 2, 9, 10 and 13).

In some other example embodiments, the logistics zone module 378 may generate a special handling instruction(s) for delivery of one or more packages in one or more of the logistics zones. For example, the logistics zone module 378 may receive an indication (e.g., by a user via user input interface 382) to generate a special handling instruction(s) for one or more logistics zones in response to receipt of a selection of the logistics zones (e.g., a user selecting the logistics zones with a pointer of the user input interface 382). For purposes of illustration and not of limitation, the special handling instruction(s) may indicate that one or more small packages (e.g., packages under a predefined weight/size) for delivery in one of the selected zones (e.g., logistics zone 37) are designated to be included in a container (e.g., placed in bag, etc.) and delivered from a cart. In this regard, based on the special handling instruction, a driver of a vehicle (e.g., mobile asset 100) in the selected logistics zone (e.g., logistics zone 37) may remove a cart from the vehicle in the selected zone and may deliver the small packages for the selected logistics zone using the cart.

In some example embodiments, the dispatch plan(s) generated by the logistics zone module 378 may include the handling instructions for each of the packages to be delivered and/or picked up according to the dispatch plan.

In some example embodiments, the street segment attributes and/or definitions data associated with each of the street segments may include location data (e.g., longitude and latitude coordinates) of the door of the houses and/or other buildings corresponding to the addresses along a respective street segment(s). As such, in some example embodiments, the logistics zone module 378 may determine the work measurement (also referred to herein as work measurement time) for one or more logistics zones (e.g., logistics zones 33, 34 and 35). For example, the logistics zone module 378 may determine the work measurement for one or more logistics zones based in part on calculating the time it takes a driver of a vehicle to walk from the middle of a street, in which the vehicle may be located, to a front door of houses and/or buildings along the street of the logistics zones for delivery and/or pickup of one or more packages. In this regard, the logistics zone module 378 may determine the total work measurement time for logistics zones of a route by adding the work measurement times for each of the logistics zones of the route (e.g., logistics zones 33, 34 and 35).

In some example embodiments, all or a subset of the selected logistics zones (e.g., logistics zones of the user interface 32) may be selected, dragged and dropped (e.g., via a pointer of the user input interface 382) on an indication (e.g., a driver's name) of a driver which may assign the selected zones to the driver for delivery/pickup of packages in the respective logistics zones.

Referring now to FIG. 16, an example embodiment of a flowchart for determining one or more logistics zones is provided according to an example embodiment. At operation 1600, an apparatus (e.g., carrier system 110) may generate one or more logistics zones in response to receipt of an indication of a selection of a geographic area (e.g., geo-fence area 10). The logistics zones may be generated based in part on items of street segment attribute data. Each of the logistics zones may include a geo-fenced right zone on a right side of corresponding street segments and a geo-fenced left zone on a left side of the corresponding street segments.

At operation 1605, the apparatus (e.g., carrier system 110) may determine addresses in each of the logistics zones based in part on analyzing the items of street segment attribute data. At operation 1610, the apparatus (carrier system 110) may generate a travel route for delivery or pickup of packages within the logistics zones based in part on a determined trace order (e.g., trace order 1-26) of the logistics zones specifying a sequential order in which to travel within the logistics zones in response to determining a shortest travel path.

It should be pointed out that FIG. 16 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., volatile memory 315, non-volatile memory 310, volatile memory 422, non-volatile memory 424) and executed by a processor (e.g., processing element 305, logistics zone module 378, processing device 408). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 16 above may comprise a processor (e.g., processing element 305, logistics zone module 378, processing device 408) configured to perform some or each of the operations (1600-1610) described above. The processor may, for example, be configured to perform the operations (1600-1610) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1600-1610) may comprise, for example, the processing element 305 (e.g., a processor) (e.g., as means for performing any of the operations described above), the logistics zone module 378, the processing device 408 and/or a device or circuitry for executing instructions or executing an algorithm for processing information as described above.

III. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:

generating one or more nodes and providing the one or more nodes for display within a user interface of an electronic map, each of the one or more nodes indicative of a connection point between one or more street segments within the user interface;

based at least in part on the generating of the one or more nodes, automatically generating, via a processor of a communication device, one or more logistics zones in response to receipt of an indication of a selection, via the user interface, of a geographic area indicated in visible indicia of the electronic map displayed via a display device of the communication device, the logistics zones are generated based in part on items of street segment attribute data associated with the one or more street segments;

generating one or more offsets of each of the one or more street segments based on assigning a predefined offset distance from the one or more street segments;

based at least in part on the generating of the one or more offsets, generating, via the processor, in each of the logistics zones, a geofenced right zone on a right side of corresponding street segments and a geofenced left zone on a left side of the corresponding street segments and providing for display the geofenced right zone and the geofenced left zone within the electronic map of the user interface, wherein the geofenced right zone and the geofenced left zone are displayed outside of the one or more street segments based on the generating of the one or more offsets;

determining, via the processor, addresses in each of the logistics zones based in part on analyzing the items of street segment attribute data;

generating a trace order based at least in part on calculating a first distance of the one or more street segments and a second distance between the one or more nodes, the trace order indicating a sequential order in which to travel within the geofenced right zone and the geofenced left zone;

based at least in part on the first distance and the second distance, generating, via the processor, a travel route for a vehicle to travel for delivery or pickup of items within the geofenced right zone and the geofenced left zone of the logistics zones;

based at least in part on the generating of the travel route within the generated geofenced right zone and the geofenced left zone, assigning, via the processor, a driver to the vehicle for the delivery or pickup of the items, along the travel route, within the geofenced right zone and the geofenced left zone in response to detection of a selection, via the user interface, of the geofenced right zone and the geofenced left zone being provided onto information indicating the driver; and in response to the generating of the travel route within the generated geofenced right zone and the geofenced left zone, detecting vehicle telematics data while the vehicle travels the route captured from a telematics device affixed to the vehicle, the vehicle telematics data indicating one or more geo-coordinates of the vehicle as the vehicle travels the route within the generated geofenced right zone and the geofenced left zone.

2. The method of claim 1, further comprising:
determining planned travel miles of the route based in part on calculating distances of each of the street segments in response to analyzing the items of street segment attribute data.

3. The method of claim 1, further comprising:
determining planned travel time of the route based in part on calculating time to travel each of the street segments in response to analyzing the items of street segment attribute data.

4. The method of claim 1, further comprising:
determining geo-coordinates of each of the plurality of offsets from each of the street segments; and
providing visible data indicating the geo-coordinates of the plurality of offsets in the user interface presented with the visible indicia of the electronic map displayed via the display device.

5. The method of claim 1, further comprising:
providing visible data of the plurality of offsets from each of the street segments on the electronic map displayed via the display device.

6. The method of claim 1, wherein prior to connecting the offset points the method further comprises:
determining a latitude coordinate and a longitude coordinate of each of the offset points.

7. The method of claim 1, further comprising:
generating a dispatch plan for the logistics zones based in part on the trace order, the dispatch plan indicating a service sequence in which to pickup or deliver the packages to the addresses of the logistics zones.

8. The method of claim 1, further comprising:
generating one or more handling instructions based in part on analyzing the trace order, the one or more handling instructions specifying a location in which one or more of the packages associated with the route are assigned for placement in a vehicle or a position in which the packages are designated for placement in a hub facility.

9. The method of claim 1, further comprising:
determining a work measurement time for delivery or pickup of the packages within the logistics zones based in part on calculating a time to walk from the vehicle to respective doors of buildings corresponding to the addresses.

10. An apparatus comprising at least one processor and at least one memory including computer program code, the at least one memory and the computer program code configured to, with the processor, cause the apparatus to at least:
automatically generate one or more logistics zones in response to receipt of an indication of a selection, via a user interface, of a geographic area indicated in visible indicia of an electronic map displayed via a display device of the apparatus, the logistics zones are generated based in part on items of street segment attribute data;

generate, in each of the logistics zones of the electronic map of the user interface, a geofenced right zone on a right side of corresponding street segments and a geofenced left zone on a left side of the corresponding street segments in response to assigning a predefined offset distance from the street segments and based in part on generating a plurality of offsets from each of the street segments based on the predefined offset distance and connecting the plurality of offsets on the electronic map to generate the geofenced right zone and the geofenced left zone;

determine addresses in each of the logistics zones based in part on analyzing the items of street segment attribute data;

generate, within the electronic map of the user interface, a travel route for a vehicle to travel for delivery or pickup of items within at least the geofenced right zone and the geofenced left zone based in part on a determined trace order specifying a sequential order in which to travel within the geofenced right zone and the geofenced left zone in response to determining a shortest travel path;

assign a driver to the vehicle for the delivery or pickup of the items, along the travel route, within the geofenced right zone and the geofenced left zone in response to detection of a selection, via the user interface, of the geofenced right zone and the geofenced left zone being provided onto information indicating the driver; and detect vehicle telematics data, captured from a telematics device affixed to the vehicle, the vehicle telematics data indicating one or more geolocations of the vehicle as the vehicle travels the route.

11. The apparatus of claim 10, wherein the memory and computer program code are further configured to, with the processor, cause the apparatus to:

determine planned travel miles of the route based in part on calculating distances of each of the street segments in response to analyzing the items of street segment attribute data.

12. The apparatus of claim 10, wherein the memory and computer program code are further configured to, with the processor, cause the apparatus to:

determine planned travel time of the route based in part on calculating time to travel each of the street segments in response to analyzing the items of street segment attribute data.

13. The apparatus of claim 10, wherein the memory and computer program code are further configured to, with the processor, cause the apparatus to:

determine geo-coordinates of each of the plurality of offsets from each of the street segments; and provide visible data indicating the geo-coordinates of the plurality of offsets in the user interface presented with the visible indicia of the electronic map displayed via the display device.

14. The apparatus of claim 10, wherein the memory and computer program code are further configured to, with the processor, cause the apparatus to:

provide visible data of the plurality of offsets from each of the street segments on the electronic map displayed via the display device.

15. The apparatus of claim 10, wherein prior to connect the offset points, the memory and computer program code are further configured to, with the processor, cause the apparatus to:

determine a latitude coordinate and a longitude coordinate of each of the offset points.

16. The apparatus of claim 10, wherein the memory and computer program code are further configured to, with the processor, cause the apparatus to:

generate a dispatch plan for the logistics zones based in part on the trace order, the dispatch plan indicating a service sequence in which to pickup or deliver the packages to the addresses of the logistics zones.

17. The apparatus of claim 10, wherein the memory and computer program code are further configured to, with the processor, cause the apparatus to:

generate one or more handling instructions based in part on analyzing the trace order, the one or more handling instructions specifying a location in which one or more of the packages associated with the route are assigned for placement in a vehicle or a position in which the packages are designated for placement in a hub facility.

18. The apparatus of claim 10, wherein the memory and computer program code are further configured to, with the processor, cause the apparatus to:

determine a work measurement time for delivery or pickup of the packages within the logistics zones based in part on calculating a time to walk from the vehicle to respective doors of buildings corresponding to the addresses.

19. A computer program product comprising at least one non-transitory computer-readable storage medium having computer-executable program code instructions stored therein, the computer-executable program code instructions comprising:

program instructions configured to generate one or more street segments and provide the one or more street segments via a user interface of a geographic area of an electronic map displayed via a display device;

in response to the generating of the one or more street segments, program instructions configured to generate one or more offsets from each of the one or more street segments based on assigning a predefined offset distance from the one or more street segments;

in response to the generating of the one or more offsets, program code instructions configured to receive an indication of a selection, via the user interface, of the geographic area indicated in visible indicia of the electronic map;

based at least in part on the generating of the one or more offsets and the receiving of the indication, program code instructions configured to automatically generate one or more logistics zones, each of the one or more logistics zones comprise a geofenced right zone on a right side of corresponding street segments and a geofenced left zone on a left side of the corresponding street segments;

in response to the automatically generating the one or more logistics zones, program code instructions configured to generate, in each of the logistics zones, a geofenced right zone on a right side of corresponding street segments and a geofenced left zone on a left side of the corresponding street segments and connecting the one or more offsets on the electronic map to generate the geofenced right zone and the geofenced left zone;

program code instructions configured to determine addresses in each of the logistics zones based in part on analyzing items of street segment attribute data associated with the one or more street segments;

based on the generating of the geofenced right zone and the geofenced left zone and determining a shortest travel path between or within the geofenced right zone and the geofenced left zone, program instructions configured to generate a trace order specifying a sequential order in which to travel within the geofenced right zone and the geofenced left zone; and based on the generating of the trace order, program code instructions configured to generate a travel route for a vehicle to travel for delivery or pickup of items within at least the geofenced right zone and the geofenced left zone.

20. The computer program product of claim 19, further comprising:

program code instructions configured to determine planned travel miles of the route based in part on calculating distances of each of the street segments in response to analyzing the items of street segment attribute data.

* * * * *

UNITED STATES PATENT AND TRADEMARK OFFICE
CERTIFICATE OF CORRECTION

PATENT NO. : 10,467,580 B1
APPLICATION NO. : 13/964766
DATED : November 5, 2019
INVENTOR(S) : Mark J. Davidson Page 1 of 1

It is certified that error appears in the above-identified patent and that said Letters Patent is hereby corrected as shown below:

In the Specification

Column 14, Line 66: After "that" insert --packages--.

Signed and Sealed this
Thirty-first Day of December, 2019

Andrei Iancu
*Director of the United States Patent and Trademark Office*